(12) United States Patent
Keskitalo et al.

(10) Patent No.: US 6,415,163 B1
(45) Date of Patent: Jul. 2, 2002

(54) METHOD FOR TRANSMITTING PILOT CHANNELS AND A CELLULAR RADIO SYSTEM

(75) Inventors: Ilkka Keskitalo, Oulu; Peter Muszynski, Espoo; Jaana Laiho-Steffens, Veikkola, all of (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 08/776,263
(22) PCT Filed: May 23, 1996
(86) PCT No.: PCT/FI96/00293
  § 371 (c)(1),
  (2), (4) Date: Jan. 24, 1997
(87) PCT Pub. No.: WO96/37970
  PCT Pub. Date: Nov. 28, 1996

(30) Foreign Application Priority Data

May 24, 1995 (FI) .................................................. 952532

(51) Int. Cl.⁷ ............................. H04B 1/38; H04M 1/00
(52) U.S. Cl. ..................................................... 455/562
(58) Field of Search .................................. 455/422, 432, 455/433, 436, 437, 438, 442, 456, 522, 440, 443, 450, 561, 562; 370/320, 335, 441, 491

(56) References Cited

U.S. PATENT DOCUMENTS

| | | | |
|---|---|---|---|
| 5,109,390 A | * 4/1992 | Gilhousen et al. | 455/68 |
| 5,130,974 A | * 7/1992 | Kawamura et al. | 360/16 |
| 5,267,261 A | 11/1993 | Blakeney, II et al. | 455/33.1 |
| 5,420,850 A | * 5/1995 | Umeda | 370/18 |
| 5,491,837 A | * 2/1996 | Haartsen | 455/62 |
| 5,570,369 A | * 10/1996 | Jokinen | 455/574 |
| 5,596,333 A | * 1/1997 | Bruckert | 455/277.1 |
| 5,602,555 A | * 2/1997 | Searle et al. | 455/562 |
| 5,646,632 A | * 7/1997 | Khan et al. | 455/524 |
| 5,724,666 A | * 3/1998 | Dent | 455/562 |
| 5,771,461 A | * 6/1998 | Love et al. | 455/422 |
| 5,825,762 A | * 10/1998 | Kamin, Jr. et al. | 455/562 |
| 5,893,033 A | * 4/1999 | Keskitalo et al. | 455/437 |

FOREIGN PATENT DOCUMENTS

| | | |
|---|---|---|
| EP | 0 647 979 A2 | 4/1995 |
| WO | WO 95/09490 | 4/1995 |

OTHER PUBLICATIONS

Naguib, et al.; "Performance of CDMA Cellular Networks with Base–Station Antenna Arrays"; Information Systems Laboratory; 1994; 87–100.

Xu, et al.;"Experimental Studies of Space–Division–Multiple–Access Schemes for Spectral Efficient Wireless Communications";Electrical Engineering Research Lab; 1994; 800–804.

EIA/TIA "Mobile Station–Base Station Compatibility Standard for Dual–Mode Wideband Spread Spectrum Cellular System"; TIA/EIA/IS–95; Jul. 1993; 6–83thru7–22.

* cited by examiner

Primary Examiner—D J. Eisenzopf
(74) Attorney, Agent, or Firm—Pillsbury Winthrop LLP

(57) ABSTRACT

A cellular radio system and a method for transmitting pilot channels in a cellular radio network includes, in each cell, at least one base station communicating with mobile stations located within its area. The base stations transmit a data signal in the downlink direction by using transmission directions that change in time and which transmit information about the system to the mobile stations on control channels. In order to enable the most efficient use of the pilot channels, the base stations transmit at least one first pilot channel with a predetermined radiation pattern and second pilot channels on transmission directions that change in time. The predetermined radiation pattern determines the cell coverage area.

21 Claims, 7 Drawing Sheets

METHOD FOR TRANSMITTING PILOT CHANNELS AND A CELLULAR RADIO SYSTEM

This application is the national phase of international application PCT/96/00293 filed May 23, 1996 which designated the U.S.

FIELD OF THE INVENTION

The invention relates to a method for transmitting pilot channels in a cellular radio network, in which, in each cell, at least one base station communicates with the mobile stations located within its area. The base stations transmit a data signal in the downlink direction by using transmission directions changing in time and transmit information about the system to the mobile stations on control channels.

BACKGROUND OF THE INVENTION

In order to operate, mobile stations in a cellular radio network require a great deal of information about the base station in the area in which they are located. In order to be able to communicate with the base station, the mobile stations should, first, be informed of the existence of the base station and synchronized with the transmission of the base station. Also, mobile stations need information, for example, about the network to which the base station belongs and about the traffic channels used. In the present cellular systems, the base stations regularly transmit information of this kind to each cell on channels allocated for that purpose.

The present invention is applicable for use, especially, in a cellular system that uses code division multiple access. Code division multiple access (CDMA) is a multiple access method, which is based on the spread spectrum technique. CDMA has been applied recently in cellular radio systems in addition to the conventional FDMA and TDMA methods. CDMA has several advantages over the conventional FDMA and TDMA methods, for example, spectral efficiency and the simplicity of frequency planning. An example of a known CDMA system is disclosed in the EIA/TIA Interim Standard: Mobile Station-Base Station Compatibility Standard for Dual-Mode Wideband Spread Spectrum Cellular System, TIA/EIA/IS-95, July 1993, EIA/TIA IS-95, which is incorporated herein by reference.

In the CDMA method, the narrow-band data signal of the user is multiplied by a spreading code having a considerably broader band than the data signal. The resulting product has a relatively wide band. In known test systems, bandwidths such as 1.25 MHz, 10 MHz, and 25 MHz have been used. In connection with multiplying, the data signal spreads across the entire band to be used. All users transmit by using the same frequency band simultaneously. A separate spreading code is used for each connection between a base station and a mobile station, and the signals of the different users can be distinguished from one another in the receivers based on the spreading code of each user.

Matched filters provided in the receivers are synchronized with a desired signal, recognized based on the spreading code. The data signal is restored in the receiver to the original band by multiplying it again by the same spreading code that was used during the transmission. Signals multiplied by some other spreading code do not correlate in an ideal case and are not restored to the narrow band. These signals appear as noise with respect to the desired signal. The spreading codes of the system are preferably selected so that they are mutually orthogonal, i.e., they do not correlate with each other.

In a CDMA cellular radio system, it is possible to use a pilot channel in the transmission direction of base station to subscriber equipment, i.e., in the downlink direction. A pilot channel is a data-unmodulated signal which is transmitted with a specific spreading code and uses the same frequency band as the actual traffic channels. The pilot signal is distinguishable from the traffic channels based on the spreading code. The pilot signal is a channel known and listened to by all subscriber equipment within the cell area. The pilot signal, for example, is used in power measurements and in the generation of a coherent phase reference. Each base station of the system transmits its own pilot signal by which the subscriber equipment can distinguish the transmissions of different base stations from each other.

U.S. Pat. No. 5109390, which is incorporated herein by reference, and the aforementioned IS-95 standard discuss a conventional CDMA cellular system which uses a separate pilot channel that is transmitted to the same coverage area with the data signals.

In a typical mobile phone environment, the signals between a base station and a mobile station propagate along several paths between the transmitter and the receiver. This multipath propagation is mainly due to the reflections of the signal from the surrounding surfaces. Signals which have propagated along different paths arrive at the receiver at different times due to their different transmission delays. CDMA differs from the conventional FDMA and TDMA in that the multipath propagation can be exploited in the reception of the signal. The receiver generally utilized in a CDMA system is a multibranch receiver structure where each branch is synchronized with a signal component which has propagated along an individual path. Each branch is an independent receiver element, which composes and demodulates one received signal component. In a conventional CDMA receiver, the signals of the different receiver elements are combined advantageously, either coherently or incoherently, whereby a signal of good quality is achieved.

CDMA systems can also apply a soft handover wherein a mobile station may simultaneously communicate with several base stations by utilizing macrodiversity. The connection quality of the mobile station, thus, remains high during the handover and the user does not notice a break in the connection.

Interference caused by other connections in the desired connection appears in the receiver as noise that is evenly distributed. This is also true when a signal is examined in an angular domain according to the incoming directions of the signals detected in the receivers. The interference caused by the other connections in the desired connection also appears in the receiver as distributed in the angular domain, i.e., the interference is rather evenly distributed into the different incoming directions.

The capacity of the CDMA, which can be measured by means of spectral efficiency, has been further improved with sectorization. A cell is divided into sectors of a desired size that are serviced by directional antennas. The mutual noise level caused by the mobile stations can be reduced significantly in the base station receiver because on average, the interference is evenly distributed between the different incoming directions which are reduced by means of sectorization. The sectorization can naturally be implemented in both transmission directions. The advantage provided in the capacity by the sectorization is proportional to the number of the sectors.

A sectorized cell may also utilize a softer handover wherein a mobile station performs a handover from one sector to another by communicating simultaneously with both sectors. Even though soft handover improves the connection quality and sectorization increases the system capacity, the movement of the mobile stations naturally leads to the stations performing several handovers from one sector to another. This loads the processing capacity of the base station controller. Several soft handovers also produce a situation where several mobile stations communicate simultaneously with more than one (usually two) sector, whereby the increased capacity provided by the sectorization is lost as a signal of a mobile station is audible in a wide sector.

The multiple access interference of the CDMA systems has also been reduced by means of different known multiple access interference cancellation (IC) methods and multi-user detection (MUD). These methods are best suited for reducing the interference produced within the user's own cell, and the system capacity can be increased to about a double compared to a system implemented without interference cancellation. However, these methods do not significantly improve the size of the coverage area of the base station compared to known technology. Also, the IC/MUD techniques are complicated to realize so they have mainly been developed in the uplink direction.

Another method that has been developed is an SDMA (Space Division Multiple Access) method wherein the users are distinguished from one another based on their location. The beams of the receiver antennas at the base station are adjusted to the desired directions according to the location of the mobile stations. For this purpose, the system uses adaptive antenna groups, i.e., phased antennas, and the processing of the received signal, to track the mobile stations.

The use of the SDMA in connection with the CDMA provides several advantages over the prior methods, such as sectorization. If the sector beams in the sectorization are narrowed in order to increase the spectral efficiency, the number of the handovers to be performed from one sector to another also increases. This in turn increases the calculation capacity required in the base station controller.

In connection with the application of the SDMA, the background art is illustrated in A. F. Naguib, A. Paulraj: *Performance of CDMA Cellular Networks With Base-Station Antenna Arrays* (Proc. International Zürich Seminar on Digital Communications, pp. 87–100, Zürich, Switzerland, March 1994), which is incorporated herein by reference. In the SDMA, a signal is received by an antenna group, and the received signal is shaped by digital signal processing so that the directivity patterns of the antennas are suitable for the stages following the shaping in the receiver. In conventional arrangements, the received signal is shaped to maximize the signal-to-interference ratio of the desired signal. The received signal is shaped so that the directivity pattern of the antenna group minimizes the interference caused by the other connections in the desired signal. In the arrangement according to the aforementioned reference, each detected signal component is subject to individual beam shaping, i.e., the impulse response must be known before the shaping.

*Experimental Studies of Space-Division-Multiple-Access Schemes for Spectral Efficient Wireless Communications* by G. Xu, H. Liu, W. J. Vogel, H. P. Lin, S. S. Jeng and G. W. Torrence (IEEE Int. Conf. On Comm. ICC 1994, New Orleans, USA, IEEE 1994), which is incorporated wherein by reference, discloses a method which applies the SDMA and in which the directivity pattern of the receiver antennas is shaped. However, the method disclosed is suitable for use only in systems where both transmission directions are on the same frequency.

When data signals, i.e., traffic channels, are transmitted to mobile stations according to the SDMA principle by using changing beams, the use of the pilot signal will be problematic in conventional arrangements. In known methods, the pilot signal has been transmitted together with the traffic channels so that the pilot could be used in the mobile stations as a phase reference to enable coherent reception. The pilot signal has also been used in the identification of base stations and as an indicator of a need for a handover. In the case of changing antenna beams, the pilot signal cannot be used as an indicator of a need for a handover.

SUMMARY OF THE INVENTION

The purpose of the present invention is to provide a method for transmitting pilot channels in connection with adaptive antenna beams so that pilot channels are used as effectively as possible. The purpose of the arrangement according to the invention is to use the pilot channels both as a phase reference and to facilitate a handover.

A method for transmitting pilot channels in a cellular network is provided. The method includes that in each cell, at least one base station communicates with the mobile stations located within its area. The base stations transmit a data signal in the downlink direction and information about the system to the mobile stations on control channels. The base stations transmit at least one first pilot channel with a predetermined radiation pattern, which determines the cell coverage area, and second pilot in transmission directions that change in time.

The invention also relates to a cellular radio system that includes in each cell, at least one base station communicating with mobile stations located within its area. The base stations transmit information about the system to the mobile stations by using control channels. The system comprises at least one base station, which transmits a data signal to the mobile stations by using radiation patterns that change in time. The cellular radio system comprises at least one base station, which transmits at least one first pilot channel with a predetermined radiation pattern, which determines the cell coverage area, and a second pilot channel in transmission directions that change in time.

In the method according to the invention, adaptive antenna beams are used and thus considerably better spectral efficiency than the conventional cellular systems, including systems applying the CDMA method, is provided. As a result, it is possible to use, for example, the pilot signal both as a phase reference and as a base station detector since both traffic channels and second pilot signals are transmitted by using a common radiation pattern and are subject to the same propagation conditions. Therefore, a pilot signal provides a phase reference for the detection of the desired signal. Correspondingly, a pilot transmitted by using a predetermined unchanging radiation pattern, which may be, for example, an omnidirectional pattern, can be used to detect the need for a handover from one base station to another.

Further, the search according to an invention for advantageous signal components in the angle-of-arrival-time domain is technically advantageous to implement.

According to a first preferred embodiment of the invention, the signal processing can be performed digitally on the base band, whereupon the antenna beams can be oriented directly to the desired directions by the phasing of the received signal. In a second preferred embodiment of the invention, the signal phasing is performed analogically, resulting in a number of fixed antenna beams from which the beams receiving the best components of the desired signal are selected for the reception.

BRIEF DESCRIPTION OF THE DRAWINGS

In the following, the invention will be described in greater detail with reference to the examples according to the accompanying drawings.

DETAILED DESCRIPTION OF PREFERRED EMBODIMENTS

In the following, the method and receiver according to the invention will be described in greater detail using the CDMA system as an example, but not restricting the description thereto, however, since the invention is also applicable in connection with other multiple access methods, as will be evident for a person skilled in the art based on the description below.

Figure 1:
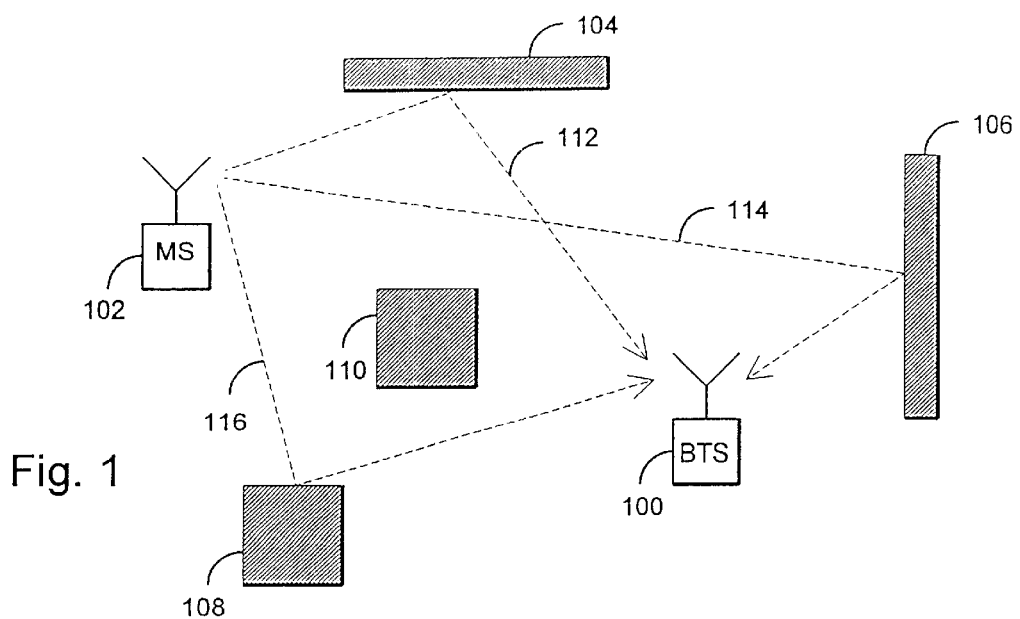
FIG. 1 illustrates the multipath propagation of a signal between a mobile station and a base station.

FIG. 1 illustrates the typical multipath propagation of a transmitted signal in a cellular system. The figure shows a base station 100 and a mobile subscriber equipment 102 communicating with the base station. A characteristic feature of cellular radio systems is that the mobile stations are surrounded by surfaces that reflect and scatter radiowaves. Such surfaces may be, for example, buildings and walls formed by the nature, such as mountains and hills. Mobile stations typically transmit with an omnidirectional antenna pattern. The figure illustrates a few rays 112, 114, 116 originating from a mobile station. The surfaces 104, 108 situated close to the mobile station 102 reflect the transmitted signal, which therefore arrives at the antenna of the base station 100 along several different paths. However, the delay between the different signal components is rather small. The reflecting surfaces situated further from the mobile station, such as larger buildings and mountains, denoted in this figure by numeral 106, produce signal components 114 which arrive at the base station 100 several, even dozens of microseconds, later. There may also be obstacles 110 in the terrain that prevent a direct connection between the mobile station and the base station.

Figure 2A:
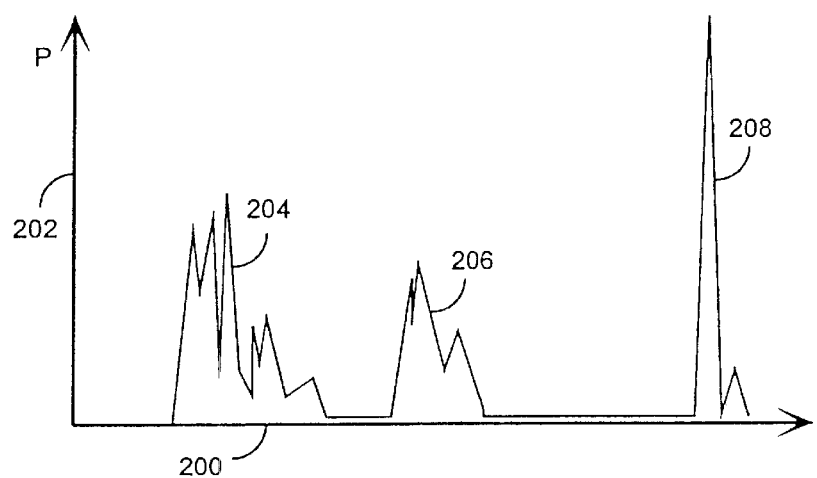
FIG. 2a illustrates, on a time domain, the scattering caused by the multipath propagation of a signal.

FIG. 2a illustrates, on the time domain, an example of a momentary delay of signal components caused by the multipath propagation of the signal at a base station receiver. The horizontal axis 200 of the schematic figure shows time and the vertical axis 202 shows the power of the received signal. In the example of FIG. 2a, the base station receiver has detected three groups of signal components 204, 206, 208 which arrived at the receiver at different times. The component 208 is significantly more delayed than the others.

Figure 2B:
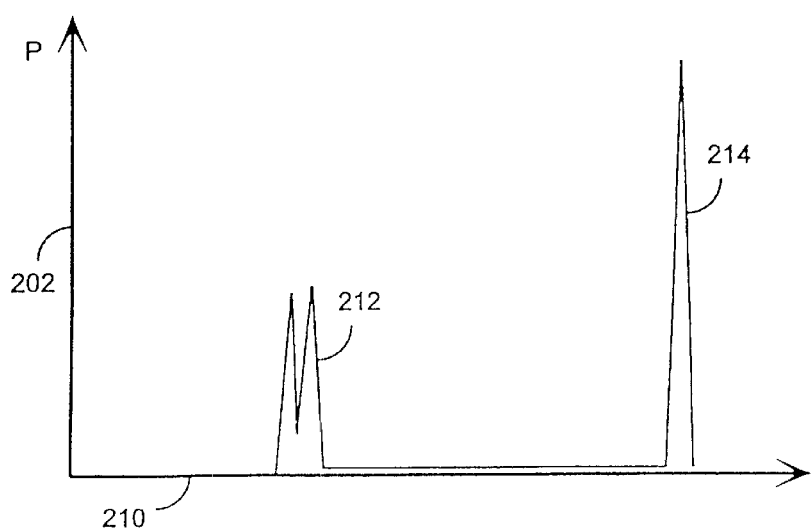
FIG. 2b illustrates, on an angle-of-arrival domain, the scattering caused by the multipath propagation of a signal.

As the example of FIG. 1 shows, the different signal components arrive not only at different times but also from different directions. Thus, the signal scatters not only in the time domain, but also in the angular domain, which can be described by the angle of arrival (AoA) of the signal. FIG. 2b illustrates an example of a momentary scattering as a function of the angle of arrival, caused by the multipath propagation of the signal, at the base station receiver. The vertical axis 202 of FIG. 2b shows the power of the received signal component, and the horizontal axis 210 shows the angle of arrival. In the example of FIG. 2b, the signal components 212, 214 arrive from two directions.

In large cells, so-called macrocells, in which the base station antennas are situated high up, the signal components generally arrive at the antenna with only a few different angles of arrival, usually in the vicinity of the direct ray between the mobile station and the base station. In small microcells where the base station antennas are usually situated below the roofs of buildings, the angles of arrival of the signal components show far greater dispersion, since like the mobile stations, the base stations are often surrounded by several reflecting surfaces situated nearby.

The multipath propagation has been described above in the uplink transmission direction. A corresponding phenomenon also occurs in the downlink direction. Multipath routes are mainly symmetrical in both directions, since the scattering and reflection are not greatly dependent on the frequency. However, fast signal fadings are mutually independent in different transmission directions.

Therefore, if the base station detects a signal component that has arrived from the mobile station at the angle of arrival of $\alpha_0$, transmitting a signal with the same angle $\alpha_0$ guides the signal in the direction of the mobile station, except for fast fadings.

The multipath propagating environment typical of cellular systems leads to the reception of a signal in the base stations, which is distributed in time into several components that are delayed differently and in the angular domain into components arriving from several different directions. Both distribution profiles vary in time since subscriber equipment moves, but the variation is rather slow, i.e., in the range of a few seconds. Also, the profiles can be synchronized with and monitored.

The received signal components are characterized by the multidimensionality of the type described above and illustrated in FIGS. 2a and 2b with the time-angular domain, i.e., $(\alpha, \tau)$ domain. This multidimensionality can be used in the base station according to the invention for improving the detection of the signal to be received. In the method according to the invention, the best signal components of the received signal are searched for in the multidimensional signal domain. The receiver is controlled by the components so that the detected components can be preferably combined and detected. The most simple standard for the signal quality can be the received power level, but also other standards can be used, for example, the signal-to-noise ratio.

Figure 4:
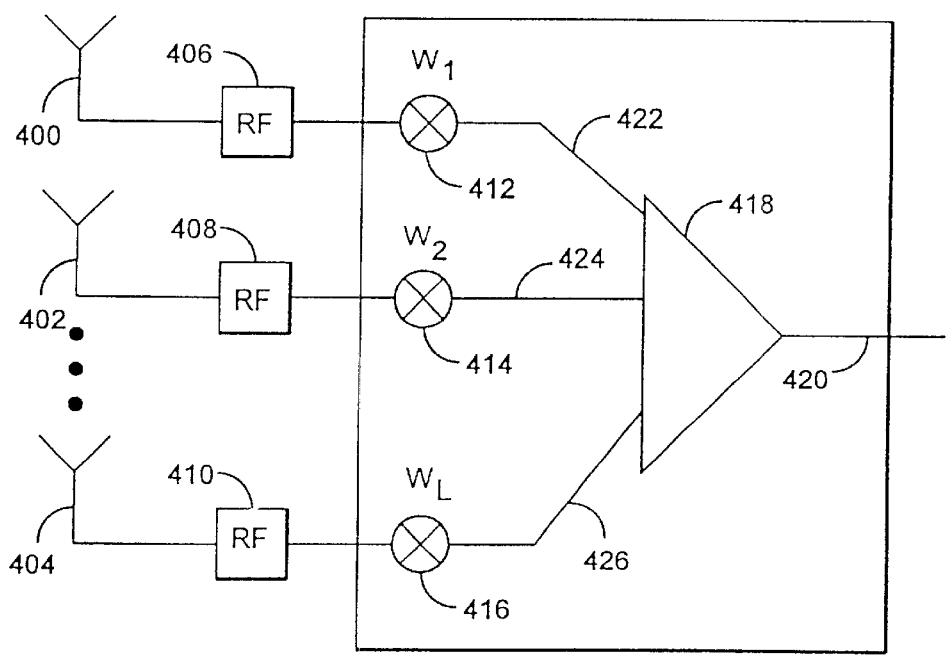
FIG. 4 shows a possible implementation of an adaptive antenna group.

The receiver according to the invention utilizes an adaptive antenna group, which is an antenna group consisting of several different elements. FIG. 4 illustrates a possible implementation of an adaptive antenna group, in connection with a first preferred embodiment of the invention. The antenna group comprises L antenna elements 400, 402, 404, which may be, for example, omnidirectional antennas. Each antenna element is connected to radio-frequency parts 406, 408, 410, which convert the received signal into an intermediate frequency and sample the signal into (I, Q) components according to known technology. The obtained complex samples are then multiplied by the corresponding complex weighting coefficients $w_i$, wherein i=1, ..., L, in multipliers 412, 414, 416. The samples 422, 424, 426 that have been multiplied are applied via an adder 418 to other parts of the receiver.

The complex weighting coefficients $w_i$ are selected according to an algorithm, which is usually adaptive, so that an antenna pattern of the desired shape is achieved. This manner of shaping the received signal can be called digital phasing of the signal, since it is performed on a signal digitized on the base band. Due to this shaping, the received signal antenna gain can be oriented in the desired directions. An antenna group may include either directional or omnidirectional antenna elements. Phasing the signal obtained from the different antennas and combining the phased signals produces virtual antenna beams into the desired directions. A corresponding treatment can also be performed on the signal to be transmitted, whereby a desired radiation pattern can be achieved.

Figure 3:
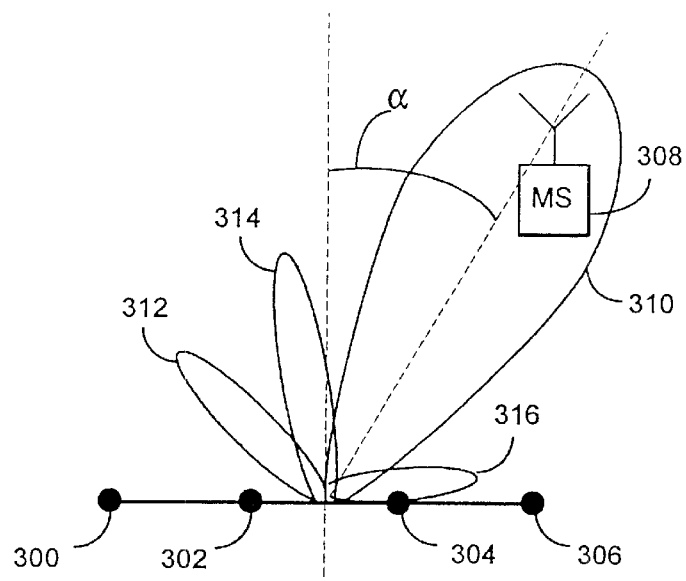
FIG. 3 illustrates a possible orientation of the beam of the base station antennas towards the mobile station.

FIG. 3 illustrates how an antenna group of an evenly spaced linear group having four elements 300, 302, 304, 306 produces a strong directed beam 310 with the angle of arrival of α towards a mobile station 308. A group of smaller side beams 312 to 316 are also formed. This directivity can be implemented with the signal phasing without the antennas being directional.

In the arrangement according to the invention, the multiple access interference of the receiver is reduced with antenna beams that are directed in the angular domain and that are produced by a new type of receiver applying time-angle diversity. In the arrangement according to the invention, the angles of arrival measured from the received signal can also be used in the transmission direction, whereby the connection quality is improved in both transmission directions.

In the following, a first preferred embodiment of the invention, which relates to applying the digital phasing of the received signal in the CDMA system, will be described.

The receiver applying time-angle diversity used at the base station comprises a digital receiver means that can monitor the received signal components in the two-dimensional (α, τ) domain and demodulate the desired signal components. Before demodulation, the received digitized signal samples are subject to phasing by which the antenna gain of the received signal is oriented in the desired signal incoming directions. In the preferred embodiment, the antenna beams produced by the phasing are beams having a predetermined shape determined by the weighting coefficients $w_i$ and the antenna geometry. These coefficients can easily be calculated for each angle of the greatest gain if the shape of the antenna beam remains constant. Therefore, the phasing can be adjusted rapidly since it is only dependent on one parameter, i.e., the angle of arrival α.

In the method according to the invention, there is no need to apply known complicated techniques, such as MUSIC, for estimating the angle of arrival, or adaptive algorithms, such as LMS and DMI. Even though these algorithms enable the calculation of the optimal beam shape for the signal to be received so that the signal-to-noise ratio of the desired signal can be maximized by directing the zero points of the antenna pattern towards the sources of interference, this is not necessary in connection with the CDMA since, as described above, the interference signal is distributed to resemble noise without having any clear directions of interference source. Therefore, it is sufficient in an environment with evenly distributed interference that the angles of the greatest gain of the antenna beams having a predetermined shape are pointed in the directions from which the best signal components are received. This enables the implementation of a more simple receiver compared to the prior art.

In the method according to the invention, the receiver searches for the desired signal components in the (α, τ) domain. This is performed by cross-correlating the received spread-spectrum signal with the desired spreading code and by comparing the obtained measurement results with the threshold values given. The search can be understood as a sweep of an antenna beam over the given area, simultaneously performing the measurement of the channel impulse response and the collection of the signal energy of the terminal equipment received from each direction. The receiver detects the direction and code phase of the reception of the best signals and allocates a required number of demodulation means for synchronizing with and receiving these signal components. The received demodulated signal components can be preferably combined in the receiver. The search for the best signal components is performed continuously and the allocation of the demodulation means is changed, if necessary.

The receiver knows the directions from which the best signal components from the mobile stations are received. This information can also be used in the base station equipment according to the invention in the downlink direction. This may be performed, for example, so that the controller of the transmitter-receiver informs the transmitter unit of the directions where significant signal components have been detected. The transmitter unit may phase the signal to be transmitted with the adaptive antenna group so that the angles of the greatest gain of the antenna beams point in the desired directions. There may be one or more transmission beams and their number may also differ from the number of the receiver beams.

This method provides considerable interference cancellation also in the downlink direction. The antenna group used in the transmission may be the same as the antenna group used in the reception or it may be a separate antenna group. The signal phasing is performed in the same way as during the reception with the weighting coefficients.

The arrangement according to the invention may use, for example, prior art mobile stations, which continuously perform measurements on the connection quality from the signal they have received from the base station. This information may comprise data concerning the number, quality, and relative delay of the signal components the mobile station has received. The arrangement according to the invention utilizes the results of the connection quality measurements performed by the mobile station when the beams of the transmission antennas are directed in the downlink direction.

The mobile station transmits the measurement results it has collected to the base station. On the basis of the information received from the mobile station and the measurements it has performed itself, the base station may vary the number, shape, or direction of the antenna beams it uses for the transmission of the signal intended to the mobile station. These changes can be implemented gradually so that the mobile station can follow the changing signal.

The base station may also use the connection quality information it has received from the mobile station for adjusting the transmit power of each antenna beam if the measurement results show that the aforementioned measures do not improve the signal quality in the mobile station.

One advantage of the method described above is that, for example, in a difficult fading situation, the mobile station may transmit to the base station a request to change the parameters of the antenna beams used in the signal transmission, for example, the direction, shape and number, whereby the quality of the signal received by the mobile station can be improved rapidly.

The prior art CDMA systems, thus, use a pilot signal that is transmitted by each base station, and that is used in the identification of base stations, in power measurement, and for enabling coherent reception in a mobile station. In known systems, a pilot signal that is a data-unmodulated spreading-coded signal is transmitted to the coverage area of the base station in the same way as the actual traffic channels.

A CDMA system implemented in the manner according to the invention applies such a method for transmitting a pilot signal that uses antenna beams that change in time in the transmission and reception of data signals. It is then possible to transmit a first pilot signal in a transmission direction that is constant in time, and second pilot signals in transmission directions that change in time and that may correspond to the transmission directions used in the transmission of the data signals.

Therefore, a pilot signal provided with transmission directions that remain constant in time can be used for the detection of a base station and for power measurements for detecting a need for a handover. Since the antenna directivity pattern used differs from the pattern of the data signals, the signal cannot be used as a reference for coherent detection. For a reference for coherent detection, a pilot signal that is transmitted with the same antenna pattern in connection with each data signal, that propagates along the same path as the actual data signal, and that enables coherent detection in mobile stations may be used.

Figure 5:
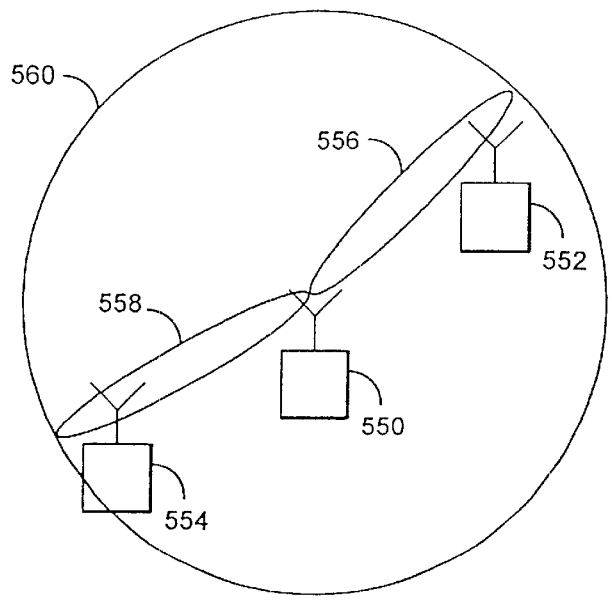
FIG. 5 illustrates the method according to the present invention for transmitting several pilot channels.

The method is illustrated in an example according to FIG. 5, wherein a base station 550 communicates with two mobile stations 552 and 554. The base station transmits a first pilot signal on a predetermined transmission direction 560 that remains constant in time and that is an omnidirectional pattern in the example of the figure. The radiation pattern of this pilot channel determines the actual coverage area of the base station where the mobile stations can establish a connection to the base station. The base station further transmits second pilot signals to the mobile stations with radiation patterns 556, 558 that correspond to the traffic channels.

The first pilot signal, which is transmitted in a predetermined transmission direction remaining constant in time, can be transmitted using a greater transmit power than the channels using the traffic channels, whereupon the greater transmit power can compensate for the weaker antenna gain, whereby the same coverage area can thus be achieved as with the directed antenna beams. Another alternative is increasing the processing gain in the subscriber terminals.

In the system according to the invention, a pilot signal can further be transmitted using a relatively narrow antenna beam, and the angle of the greatest gain of this antenna beam can be directed so that the antenna beam sweeps the cell area. Thus the antenna beam comprising the pilot signal sweeps the cell like a lighthouse, and the transmission of a continuous pilot to the entire cell area can be avoided. The pilot can also be transmitted with several sweeping antenna beams, which are phased so that they do not overlap. The base station informs the mobile stations on a control channel about the time when the pilot channel sweeps each area.

Figure 6:
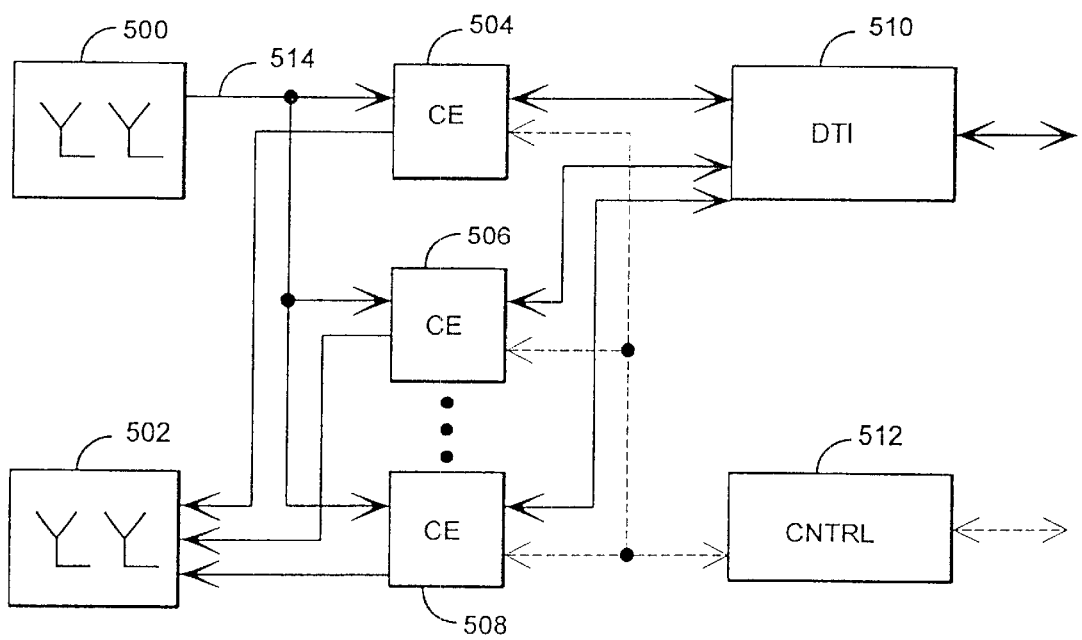
FIG. 6 is a block diagram illustrating a possible structure of a receiver according to the present invention.

In the following, the structure of a receiver according to the first embodiment of the invention will be described. FIG. 6 is a block diagram illustrating the structure of a receiver according to the invention. The receiver comprises an antenna group 500 consisting of L separate antenna elements. The antenna group may be linear, planar (two-dimensional), or omnidirectional. The antenna group 500 receives a multipath-propagated signal that is delayed in different ways from several different directions from each mobile station with each of the L elements, performs the preamplification, converts the signal into an intermediate frequency and digitizes all the L signals. The obtained L digital complex I, Q samples 514 are supplied into an input of channel elements 504, 506, 508.

Each active mobile station communicating with the base station is serviced by one channel element, which performs digital signal processing both on the received signal and on the signal to be transmitted, as will be described in greater detail below. Each channel element comprises a ($\alpha$, $\tau$) receiver and a corresponding transmitter. The digital shaping functions of the antenna beam, realized by signal phasing, are performed in a channel element both in the transmission direction and in the direction of reception.

In the direction of reception, a channel element filters the signal on the angle-space domain, demodulates the received signal components and combines them in a diversity combiner, and in the end, decodes the signal that has been received from the mobile station and that has been combined. The obtained user data bits are supplied to a baseband unit 510, which forwards them to other parts of the network.

In the transmission direction, the user data bits arrive from the other parts of the network to the baseband unit 510, which forwards them to the correct channel element 504 to 508 where they are encoded, modulated by a spreading code and subjected to the phasing of the signal to be transmitted, the phasing determining the directions of the antenna beams to be transmitted. The obtained L signals are supplied to each of the L elements of the antenna group 502. In practice, the reception and transmission antenna groups 500, 502 may be either separate or implemented by means of the same physical antenna group where the directions of transmission and reception are separated with suitable duplex filtration.

In the transmission antenna group 502, the signals that have arrived from each channel element and that are intended to each antenna element are converted into analog form, transferred to a radio frequency and transmitted via the antenna elements.

In the arrangement according to the invention, the transmission and reception antenna groups may naturally comprise a different number of antenna elements, even though the description above discloses the same number L of elements in each group for the sake of simplicity. The figure also shows a control block 512, which controls the operation of the different units of the equipment, such as the allocation of the channel units to different connections according to the messages from the base station controller.

Figure 7:
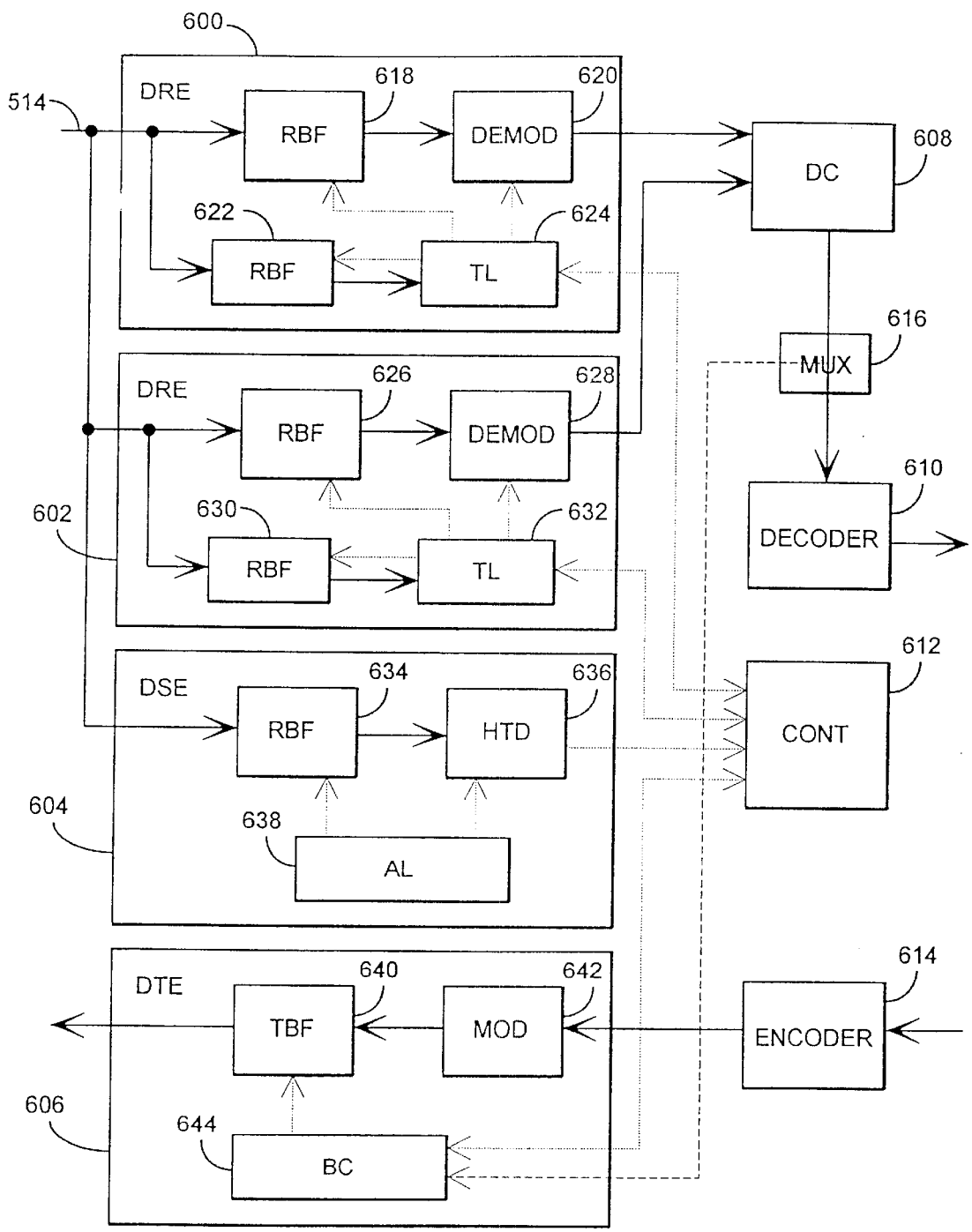
FIG. 7 is a block diagram illustrating an example of the structure of an individual channel element.

FIG. 7 is a block diagram illustrating the structure of a channel element in a receiver according to the first embodiment of the invention. The channel element comprises one or several digital receiver units 600, 602 two of which are shown in the figure, one or several searcher units 604 one of which is shown in the figure, a diversity combiner 608 the input of which comprises a signal from the receiver units, a decoder 610 to the input of which a signal that is visible at the output of the diversity combiner 608 is connected, and control means 612. The L digital complex I, Q samples 514 arriving from the antenna group are supplied to the input of all the digital receiver units 600, 602 and searcher units 604. If the arrangement according to the invention is applied in a transmitter-receiver, the transmitter-receiver according to the invention also comprises an encoder 614 and a digital transmission unit 606.

The operation of the digital searcher unit 604 is examined first with reference to FIG. 7. In the same way as in a conventional rake receiver, the function of the searcher unit is to search for the desired signal components from the received signal. In the arrangement according to the invention, a new type of searcher unit continuously monitors the received signal in the $(\alpha, \tau)$ domain and searches for useful signal components and gives their parameters, i.e. the angle of arrival (AoA) and the delay profile, to the control means 612, which in turn allocate a required number of receiver units for demodulating the best components. The receiver according to the invention can naturally also be implemented in such a way that a channel element does not comprise separate control means 612, but the searcher unit 604 forwards the information concerning the signal components to be monitored directly to the receiver branches 600, 602.

The searcher unit comprises means 634 for phasing the signal supplied from the radio-frequency parts of the antenna group, and means 636 for detecting whether the signal obtained from the output of the phasing means 634 comprises a signal component received with the given delay and for measuring the quality of this signal component. The searcher unit further comprises means 638 for controlling the aforementioned phasing means 634 and the measuring means 636 in such a way that the incoming directions and delays of the received signal can be measured.

The means 634 for phasing the signal supplied from the radio-frequency parts of the antenna group can be implemented for example with equipment of the type described above and shown in FIG. 4, the equipment comprising the multiplication of the signal with complex coefficients $w_i$ (i=1, . . . , L) by means of which it is possible to determine the angle of arrival of the signal that is visible amplified in the output signal of the phasing means. Each combination of the coefficients corresponds to a certain combination of antenna beams, as described above. The phasing means (634) are controlled by the means 638 so that all the essential incoming directions of the signal can be examined.

The output of the phasing means thus shows a signal that corresponds to the signal received from a given direction on the basis of the control of the means 638. The measuring means 636 perform a measurement with different delays on a signal visible at the output of the phasing means, the purpose of the measurement being to detect the signal components that have different delays. The delay to be measured each time is set with the aforementioned means 638. In the measuring means, the signal situated at the input of the means is subjected to despreading, measurement of the complex signal energy and squaring of the energy for example over the coherence time of the channel, and comparison of the obtained measurement result with the given threshold value. The parameters of the measured signal components having a strength exceeding the given threshold value, i.e. the angle of arrival, delay and power, are provided to the control means 612 of the channel element.

A controller 638 controls the operation of the phasing means 634 and the measuring means. The controller 638 corresponds to a synchronization loop provided in the searcher branch of a conventional rake receiver, even though in the arrangement according to the invention the controller operates in a new manner. The search for the desired signal components from the $(\alpha, \tau)$ domain can be implemented in many ways under the control of the means 638. As stated above, the measurement of the signal power can be replaced with some other measurement of the signal quality.

The digitized signal received by the antenna group can be phased in the phasing means 634, step by step, so that the direction angle of the greatest gain is changed with given angle intervals. From among the possible incoming directions, one selects a representative group of angles of arrival $\alpha_j$ which are situated at desired angle intervals from one another, and each incoming direction is subject to several energy measurements at different delay values, whereby a delay profile $\tau_k$ is obtained for the incoming directions.

Another way is to direct the measuring means 636 to first measure the delay profile $\tau_k$ of the received signal, for example, with a non-directional antenna pattern. The possible delays with which signal components are received are, thus, detected. The phasing means 634 are thereafter directed to sweep the different direction angles with a narrow directional beam, and the measuring means are simultaneously guided to measure with the aforementioned delay values detected in the first measurement. The incoming directions $\alpha_j$ of the components that have arrived with different delays are, thus, obtained.

The parameters of the detected signal components are given to the control means 612 of the channel element. The control means allocate the receiver elements 600, 602 to receive and demodulate the best detected signal components by informing the receiver element of the incoming direction and delay of the signal component. As stated above, the receiver elements can also be controlled directly by the searcher unit 604 without separate control means.

The operation of the digital receiver unit 600, 602 will be described with reference to FIG. 7. Similar to a conventional rake receiver, the receiver unit receives and demodulates a given signal component. Assuming that the control means 612 of the channel element has allocated a receiver unit to receive a particular signal component, the parameters are the angle of arrival ($\alpha_j$ and the delay $\tau_k$.

The receiver unit 600, 602 includes a monitoring means 624, 632 to which the control means 612 of the channel element forwards the information about the phase and incoming direction of the signal component to be monitored. The monitoring means controls the first phasing means of the receiver unit. The input of the first phasing means is the digitized signal obtained from the antenna group. The phasing means 618, 626 have a similar structure as the phasing means 634 provided in the searcher unit. Based on information relating to the angle of arrival $\alpha_j$ and received from the control unit, the monitoring means sets the complex weighting coefficients $w_i$ (i=1, . . . , L) so that a signal arriving from the desired incoming direction is visible at the output of the phasing means. This can be understood as a receiver antenna beam pointing in the desired direction and having a predetermined shape.

The receiver unit 600, 602 also includes a demodulation means 620, 628.

The input of the demodulation means comprises a signal obtained from the phasing means 618, 626. The monitoring means 624, 632 guides the demodulation means to synchronize with a signal component arriving with a given delay $\tau_k$. In the demodulation means, the signal is subject to despreading and demodulation according to known technology using the given $\tau_k$ as the code phase. The obtained symbols are supplied to the other parts of the channel element together with the delay data.

The receiver unit 600, 602 also includes a second phasing means 622, 630.

The input of the second phasing means comprises a digitized signal obtained from the antenna group. The output signal of the second phasing means is supplied to the monitoring means 624, 632. The monitoring means controls the operation of the second phasing means by measuring the environment of the current parameters ($\alpha_j$, $\tau_k$) of the signal component allocated to the receiver in order to detect possible changes in the incoming direction and delay of the received signal component. For this purpose, the second phasing means includes complex coefficients similar to the first phasing means for phasing the signal, and means similar to the measuring means 636 situated in the searcher unit for measuring the impulse response. If the monitoring means detects by the second phasing means changes in the incoming direction $\alpha_j$ or delay $\tau_k$ of the desired signal component, this data is updated to the first phasing means and to the demodulation means.

The prior art discloses several ways in which the monitoring means 624, 632 can be implemented in a spread spectrum system, for example, Early-Late gates, that can be used in the arrangement according to the invention. These circuits estimate the code timing error by performing two energy measurements with the given time difference $\Delta\tau$, which is typically a fraction of the chip time of the spreading code in the environment of the current set point $\tau_k$. The energy measurements are performed with the measuring means of the second phasing means 622, 630, which provide the correction data required by the nominal set point $\tau_k$ as the delay changes.

Correspondingly, changes in the angle of arrival $\alpha_j$ of the signal can be monitored by the second phasing means. It is, for example, possible to perform, with the given delay $\tau_k$, two or more energy measurements with antenna beams which have been deflected by an angle $\Delta\alpha$ in both directions from the current angle of arrival $\alpha_j$ by phasing. The degree of the deflection $\Delta\alpha$ used is typically a fraction of the width of the antenna beam.

The monitoring means 624, 632, thus, control the energy measurements performed by the second phasing means 622, 630 so that a signal could be received with the greatest possible energy at all times. The monitoring means updates the data about the changed parameters ($\alpha_j$, $\tau_k$) to the first phasing means, the demodulation means, and the control means 612 of the channel element so that the data could be used in the transmission direction, if required.

The above-described maximization of the received signal can be compared with the receiver antenna diversity used in conventional systems, wherein a signal is received with two or more antennas situated from each other at a distance having the length of several wavelengths of the received signal. In the receiver according to the invention, if a signal received with the angle of arrival $\alpha_j$ is caught in a deep and long fading situation, the fading can probably be eliminated by changing the angle of the receiver beam by a small angle $\Delta\alpha$. There is, thus, no need for two separate antennas situated at a given distance from each other.

The operation of the diversity combiner 608 and the decoder 610 of the channel element is similar to the prior art diversity receivers. The combiner 608 combines the symbol sequences arriving from the different receiver elements by taking into account and compensating for their different delays $\tau_k$, and possibly by weighting the different symbol sequences according to their signal-to-noise ratios to obtain maximum ratio combination. The combined symbol sequence obtained is supplied to the decoder 610, which decodes the symbols to user data bits, usually performing the deinterleaving first. The CDMA applications generally use a strong convolutional coding. The best method of detection is the Viterbi algorithm which provides a soft decision.

It is clear that the above-described channel element can also be used for monitoring and receiving an access channel. The antenna beams used in the direction of reception have then wider antenna patterns, i.e., they can be, for example, 120° wide, since the exact location of the mobile stations transmitting call-set-up messages is not known.

The operation of the digital transmission unit 606 will be described with reference to FIG. 7. The user data bits are first supplied to the encoder 614, which encodes the bits, typically with a convolutional code, and performs interleaving on the encoded symbols. The obtained interleaved symbols are applied to a spread spectrum modulator 642, which performs conventional modulation. All the above-described functions can be performed according to known technology.

In the present invention, the transmission unit includes means 644, 640 which controls and digitally phases the signal to be transmitted in response to the received signal. In the transmission unit according to the invention, the means 644 for adjusting the transmission beam receives from the control means 612 of the channel element, information about the incoming directions used in the different receiver units 600, 602 which receives a signal from the mobile station. The control means 612 may also report the other incoming directions of the signal detected by the searcher unit 604, but not all directions are necessarily used in the reception of the signal.

The means 644 of the transmission unit for adjusting the transmission beam controls the phasing means 640, which calculates from predetermined beam-forming functions J×L a complex weighting coefficient $w_{ij}$ (i=1, ... L; j=1, ..., J) which produces J antenna beams by means of L antenna elements. In addition to the direction and number of the antenna beams, the means 644 controls the phasing means 640 by indicating the transmit power to be used with each beam and the means 644 obtained from the control means 612 of the channel element.

The structure of the phasing means 640 may be similar to the phasing means 618, 626, 634, described above, in the direction of reception. In the phasing means, the digitized (I, Q) samples of the outbound signal supplied from the modulation means 642 are multiplied by L complex weighting coefficients, where L is the number of the antenna elements, as follows:

$$V_i = \sum_{j=1}^{J} g_j w_{ij}, \quad i = 1, \ldots, L$$

whereby L complex sample sequences are obtained for the antenna group. The complex multiplication also uses a real scaling factor $g_j$(j=1, ..., J), which is obtained from the adjusting means 644 and which can be used for the independent power adjustment of each antenna beam. The adjusting means 644 also indicates the frequency to be used so that the weighting coefficients $w_{ij}$ can be set correctly.

The arrangement according to the invention can also use special beam control bits that a mobile station generates based on the signal it has received and that it adds to the signal it transmits to the base station. The receiver according to the invention includes a means 616 for demultiplexing and detecting these beam control bits from the received signal. The detection should be performed before the decoder 610 in order to avoid delays. The beam control bits are forwarded to the adjusting means 644 of the transmission unit.

The means 644 for adjusting the transmission beam controls the phasing means 640 based on the information obtained from the control means of the channel element and the beam control bits transmitted by the mobile station. The adjustment can be performed in many ways by modifying the parameters $\alpha_j$ and $g_j$ (j=1, . . . , J) in different ways. For example, the transmit power used with some antenna beams can be independently adjusted, or the direction angle $\alpha_j$ of some antenna beams can be changed by a given angle $\Delta\alpha$, or the number of the antenna beams used can be altered. With these measures it is possible to compensate for the deterioration of signal quality, such as fadings, occurring over the radio path.

In the arrangement according to the invention, the adjusting means 644 of the transmission unit 606 can deflect the direction of one or several of the used antenna beams by small degrees $\Delta\alpha$ in the environment of the given direction angle $\alpha_j$. Due to such deflection, it is possible to reduce the likelihood that the mobile station would be in a deep fading for a long time. Since the direction angle of an antenna beam continuously vibrates around a nominal direction angle $\alpha_j$, a signal that has propagated over the radio path does not continuously use the same route. This method can be considered a new type of antenna diversity in the downlink direction.

Further, in the arrangement according to the invention, the adjusting means 644 can control the phasing means 640 so that a high-power signal having a wide antenna beam is obtained from the antenna group with the suitable adjustment of the weighting coefficients $w_{ij}$ (i=1, . . . , L; j=1, . . . , J) and the factors $g_j$(j=1, . . . , J). The obtained antenna pattern may be, for example, a sector pattern or an omnidirectional pattern. For example, a data-unmodulated pilot signal can be transmitted with a permanent antenna pattern. The same method can also be applied in the transmission of control channels.

Also, in the arrangement according to the invention, the adjusting means 644 can control the phasing means 640 so that with the suitable adjustment of the weighting coefficients $w_{ij}$ (i=1, . . . , L; j=1, . . . , J) and the factors $g_j$=1, . . . , J), one or several signals having a rather narrow antenna beam are obtained from the antenna group, the angle of the greatest gain of the signal sweeping continuously the cell area. The obtained antenna pattern can be used for the transmission of a data-unmodulated pilot signal.

A second preferred embodiment of the invention, in which the analog phasing of a received signal is applied in the CDMA system, will be described below.

Figure 8:
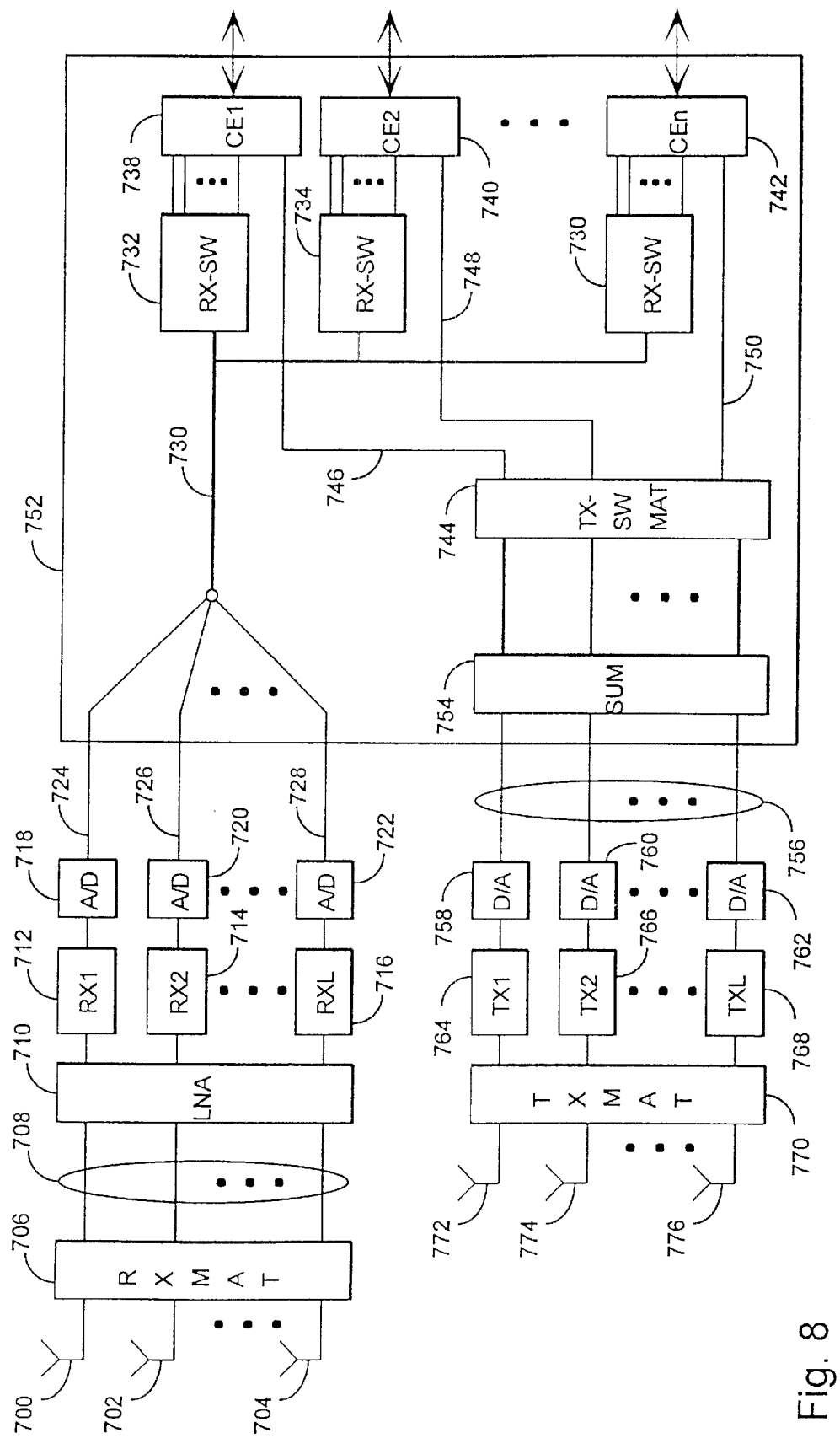
FIG. 8 is a block diagram illustrating another example of a receiver according to the present invention.

FIG. 8 is a block diagram illustrating an example of the equipment according to the second preferred embodiment of the invention. The equipment includes, in the direction of reception, a given number L antenna elements 700 to 704, and, in the transmission direction, a group of antenna elements 772 to 776. In the transmitter-receiver, the transmission and reception antennas may be the same, whereby duplex filtration is used to separate the different transmission directions from one another. The figure shows different antenna elements for the different transmission directions. The group formed by the antenna elements may be linear, planar (two-dimensional), or omnidirectional. The antenna group receives a multipath-propagated signal that is delayed in different ways from several different directions with each of the L elements from each mobile station.

The antenna elements are connected to an RX matrix 706, which performs phasing on the analog signal received by the antenna elements so that the matrix output 708 includes K signal outputs. Each output corresponds to a signal received by an antenna beam pointing in a predetermined signal incoming direction. The matrix can be implemented by prior art arrangements, such as a Butler matrix that is realized with passive 90° hybrids and phase shifters. The number K antenna beams produced with the matrix 706 does not necessarily correspond to the number L antenna elements.

The antenna beams are obtained in the direction of reception, by phasing the signal received by the antennas, and in the transmission direction, by phasing the signal to be transmitted by the antennas. The antenna beams used are constant and their directions cannot be changed. The number of the antenna beams depends on the matrix 706 implementation and the beams can be set at desired angle intervals from one another and formed with a desired width.

The matrix output signals 708 are applied, if necessary, to a group of low-noise amplifiers 710, which compensate for the cable attenuations and other losses. The L signals amplified in this manner are supplied to the radio-frequency parts 712 to 716, which subject each signal to down-conversion into an intermediate frequency and to the required filtrations. The radio-frequency parts can be implemented in a manner according to known technology.

The intermediate-frequency signals are then applied to converter means 718 to 722. The converter means converts the analog signal into digital samples. The conversion can be performed in manners according to known technology with commercially available components. Typically, complex sampling into I and Q components is performed in the means.

The output signals 724, 726, 728 of the converter means 718, 720, 722 are supplied to a group of channel elements 738, 740, 742 via an RX switch 732, 734, 730, preceding each channel element. All of the output signals 730 of the converters are applied to all of the RX switches. Each RX switch, thus, includes K inputs and one or several output signals that are applied to a corresponding channel element. The function of the RX switch is to guide a signal received by a desired antenna beam to a desired component of the channel element according to control from the channel element.

The above-described receiver structure can naturally also be implemented so that one or several of the aforementioned parts (antenna elements 700–704, amplifiers 710, radio-frequency parts 712–716 and converter means 718–722) are located either integrated together or separately. In such a case, the details of the implementation vary, as it is evident for a person skilled in the art, for example, so that if the radio-frequency parts are situated in connection with an antenna group, there is no need for amplifiers 710.

Figure 9:
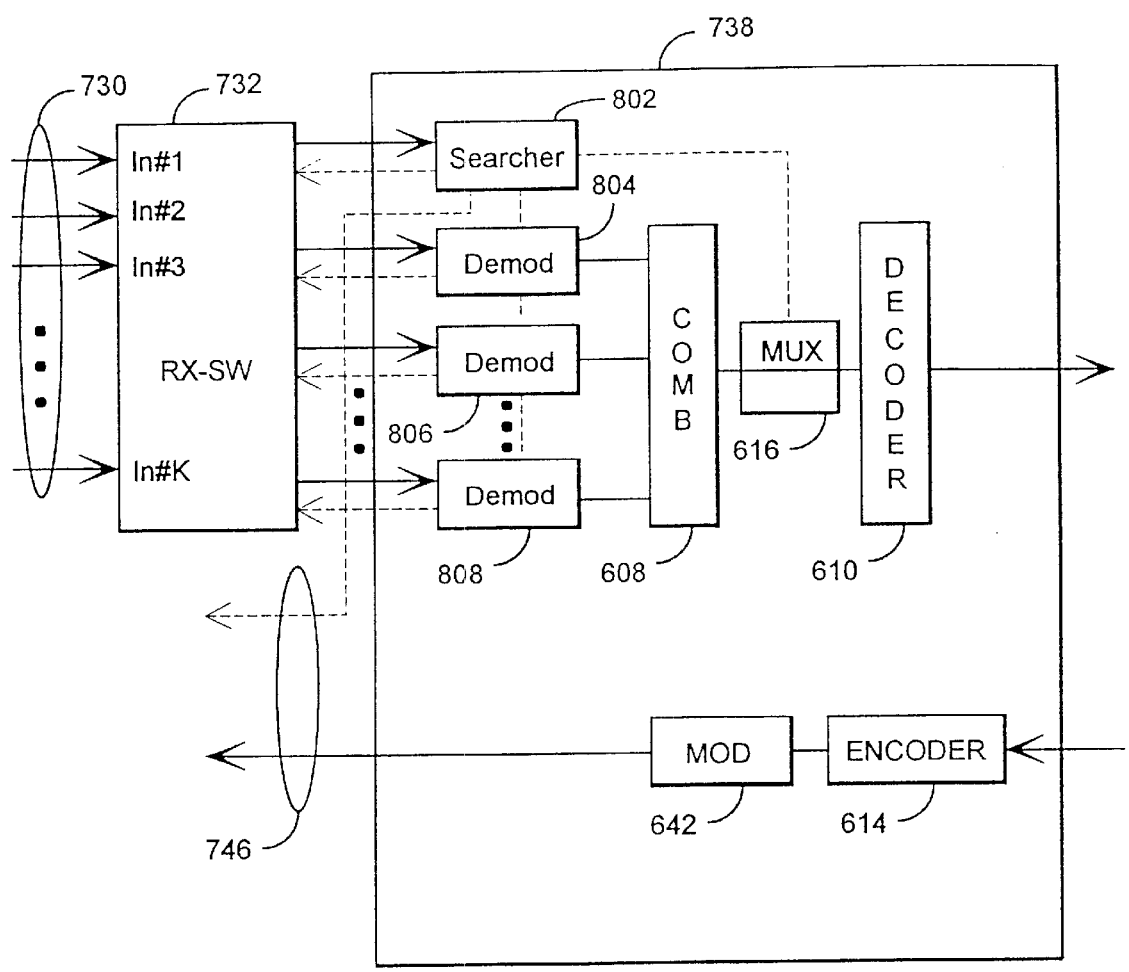
FIG. 9 illustrates another example of the structure of an individual channel element.

In the following, the structure and operation of a channel element in a receiver according to the second embodiment of the invention will be described with reference to the block diagram of FIG. 9. The channel element includes one or several means 804, 806, 808 for demodulating a signal (FIG. 9 shows three means), one or several searcher units 802 (one is shown), a diversity combiner 608, and a decoder 610. The input of the diversity container 608 includes a signal from the receiver units. The decoder 610 receives input signal which is visible at the output of the diversity combiner 608.

The inputs In#1 to In#K of the RX switch 732 include the K signals 730 from the converter means 718 to 722. The channel element 738 includes a searcher unit 802. The function of the searcher unit is to perform the search for the best signal components from the multidimensional signal domain, as described in connection with the searcher unit of the first embodiment. In the present embodiment, the searcher unit 802 searches for the best signal components from the inputs of the RX switch. Each input corresponds to a signal component arriving from a certain direction. The searching unit searches by measuring the delay profile from each input of the RX switch. The measurement of the delay profile can be performed in the same manner as in the searcher branch of a conventional rake receiver. As a result of the measurement, the searcher branch detects the incoming directions and delays of the best signal components. The searcher unit guides the demodulation means 804, 806, 808 to synchronize with the best components by providing each demodulation means with information about the delay of the desired component and by applying the signal of this direction from the RX switch to the corresponding demodulation means.

The demodulation means 804, 806, 808 demodulates the given signal, monitors the changes in the delay and incoming direction of the signal, and starts receiving a new antenna beam by the RX switch, if required. The output signals of the demodulation means are applied to a diversity combiner 608, which preferably combines the demodulated symbols and detects the information transmitted. The output signal of the diversity combiner is applied to the decoding means 610, which deinterleaves the symbols and decodes the information sequence.

The above-described receiver structure implements the arrangement according to the invention by analog phasing. In the reception, a number (K) fixed antenna beams are produced by the phasing. The strongest signal component is selected for demodulation from the components received by the antenna beams. As the terminal equipment moves and the incoming directions of the signal change, the signal of the antenna beam providing the best signal strength is always selected for demodulation.

The receiver structure according to the second preferred embodiment of the invention will be described below with reference to FIG. 9.

The user data bits are first supplied to an encoder 614, which encodes the bits typically with a convolutional code and performs interleaving on the encoded symbols. The obtained interleaved symbols are applied to a spread-spectrum modulator 642, which performs conventional modulation. All the above-described functions can be performed according to known technology.

In the present invention, the receiver implementation also includes a means 802 for controlling the analog phasing of the signal to be transmitted in response to the received signal. Based on its measurements, the searcher unit 802 knows the direction angles and the corresponding antenna beams which receive the best signal components. The searcher unit allocates a group of demodulation means to receive these components. In a practical implementation, the control of the transmitting end can take place in the searcher unit or in a separate control unit. For the sake of simplicity, only the first alternative is described herein, without limiting the invention thereto, however. In any case, the idea of the invention is the same in both alternatives. As described above, in the arrangement according to the invention, the detected incoming directions having a good signal level are used when transmitting a signal in the opposite transmission direction.

An implementation of the transmitter part will be described below with reference to FIG. 8. The transmitter includes a given number L antenna elements 772, 774, 776, which may be the same as the antenna elements in the direction of reception. The antenna elements are connected to a TX matrix 770.

The TX matrix analogically phases the signal to be transmitted to different antenna elements so that the main beam of the directivity pattern points in the desired direction. The input of the TX matrix includes K signals 756, which have been converted into analog form in D/A converters 758 to 762, converted into a radio frequency, and amplified in radio-frequency parts 764 to 768. As already mentioned in connection with the description of the receiving end, the above-described components can be implemented in practice in several ways either together or separately, as it is clear for a person skilled in the art.

The TX matrix phases the K signals situated at the input so that the antennas provide antenna beams to K different directions. The directions of the antenna beams are fixed and the beams together cover the desired area. The implementation of the TX matrix 770 is similar to the RX matrix 706 and it can be realized, for example, with a Butler matrix that is implemented with passive 90° hybrids and phase shifters. The number K antenna beams produced with the matrix 770 does not necessarily correspond to the number L antenna elements.

Figure 10:
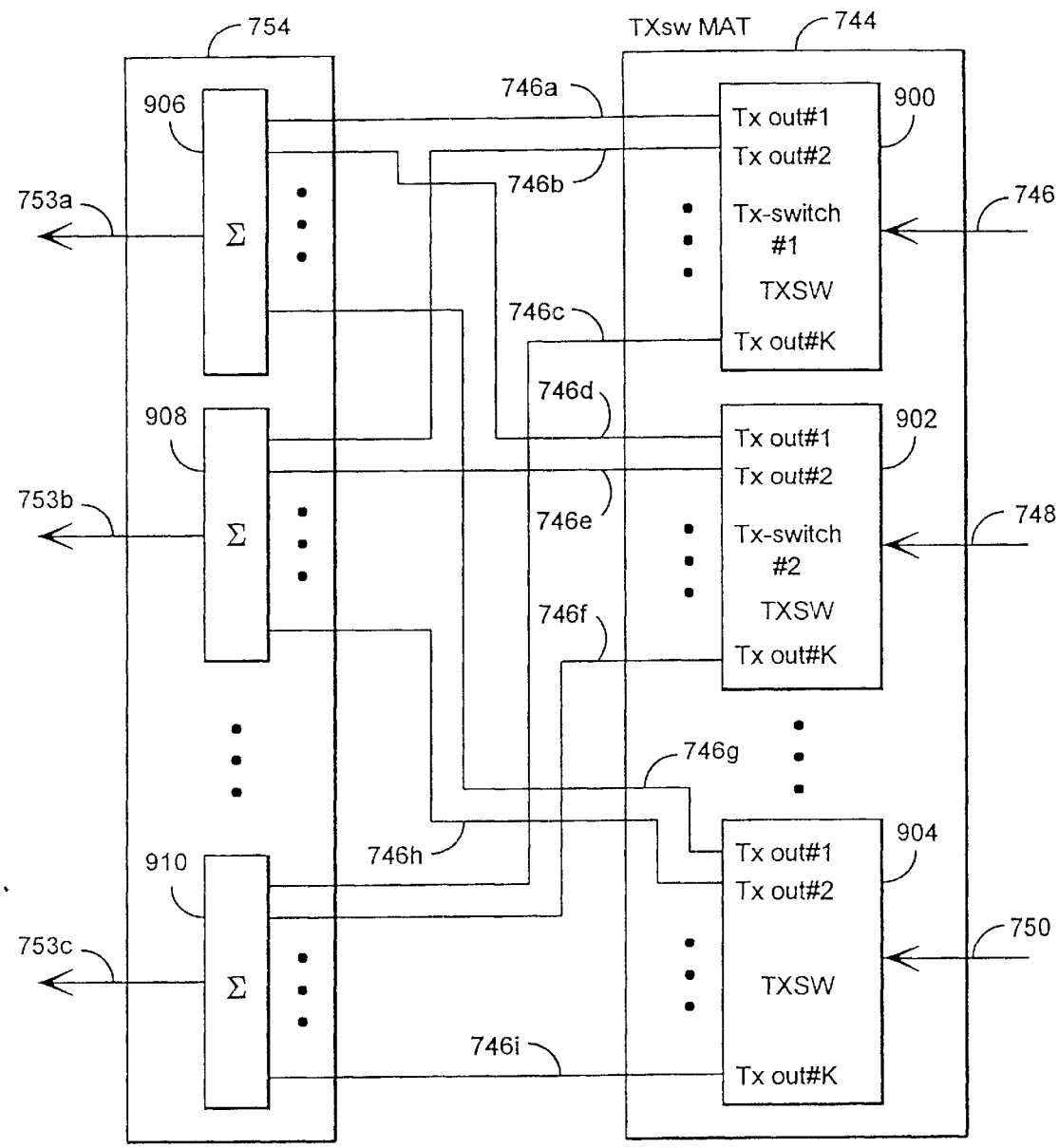
FIG. 10 illustrates more closely an example of the structure of an individual channel element.

The modulated data signal and the control 746 from the searcher unit are supplied from each channel element 738, 740, 742 to the TX switching matrix 744. The signals are then supplied to adding means 754. The operation of the switching matrix 744 and the adding means 754 will be described in greater detail with reference to FIG. 10.

The TX switching matrix includes a TX switch 900, 902, 904 which corresponds to each channel unit. The input of the switches is both the modulated data signal that is to be transmitted and arrives from the channel unit, and a control signal 746, 748, 750 from the searcher unit of the channel unit. The output of the TX switch includes K outputs 746a to 746i, i.e., as many as there are transmission antenna beams. The function of each TX switch is to route the signal from the channel element to the correct transmission beams to be summed together with signals arriving from the other channel elements and intended to the same beam on the basis of the control from the channel element. The TX switch guides the incoming data signal into one or several outputs Txout#1 to Txout#K, depending on the control from the channel element, i.e., depending on which antenna beams the signal is intended for. Each output is a quadratic digital sample weighted with the signal level.

Each output 746a to 746i of the switch is applied to one of the K adders 906 to 910 of the adding means 754. Each adder digitally adds together the data signals arriving from different channel units, intended for a given antenna beam. The required bit number for an outbound sample is obtained with the formula $2*(\log(n)+m)$, wherein n is the number of the inputs (channel units) of the adders, log is a two-based logarithm and m is the bit number of the samples.

Each of the outputs 756a to 756c of the TX switches is applied to a corresponding converter means 758 to 762 and to antennas via an analog phasing matrix, as described above.

In the second preferred embodiment of the invention, it is also possible to utilize special beam control bits, which a mobile station generates based of the signal that it has received and that it adds to the signal it transmits to the base station. With reference to FIG. 9, the receiver according to the invention includes a means 616 for demultiplexing and detecting these beam control bits from the received signal. The detection should be performed before the decoder 610 in order to avoid delays. These beam control bits are forwarded to the searcher unit 802 of the channel unit.

The searcher unit 802 selects the antenna beams to be used in the transmission based on the information it has measured and the beam control bits transmitted by the mobile station.

In the second preferred embodiment of the invention, a pilot signal sweeping the cell area in the form of a narrow antenna beam can be implemented so that the antenna beam used in the transmission of the pilot signal is changed so that the pilot signal is transmitted by using each antenna beam in turn, whereby the pilot signal sweeps the cell area in stages.

Even though the invention is described above with reference to the examples according to the accompanying drawings, it is clear that the invention is not restricted thereto, but it can be modified in many ways within the scope of the inventive idea disclosed in the appended claims.

The alignment of the antenna beams can be used, for example, in both the vertical and the horizontal direction, whereby the above-described ($\alpha$, $\tau$) domain can be understood as an ($\alpha$, $\beta$, $\tau$) domain, wherein $\alpha$ is the vertical angle, $\beta$ is the horizontal angle, and $\tau$ is the delay.

Another possibility is to utilize coherent, incoherent or differentially coherent modulation and demodulation methods in the channel elements. For example, in order to enable coherent demodulation in a mobile station, the base station may include an additional spreading-coded signal without data modulation in each antenna beam as a phase reference. Alternatively, known reference symbols can be used for the same purpose.

Another embodiment of the invention includes positioning the digital phasing means 618 to 634 of the channel elements in one common phasing means block, which services all channel elements.

What is claimed is:

1. A method for transmitting pilot signals in a cellular radio network, having in each cell, at least one base station configured to communicate with mobile stations located within its coverage area, the communication including (i) transmitting at least one data signal in a downlink direction using transmission directions that change in time, and (ii) transmitting information about the network to said mobile stations on control channels, said method comprising:

said at least one base station transmitting at least one first pilot signal to all mobile stations within the cell, said pilot signal having a predetermined radiation pattern, said radiation pattern defining the coverage area, and said at least one base station transmitting a second pilot signal in said transmission directions that change in time, wherein said second pilot signal is incapable of carrying control information, and wherein said at least one data signal and said second pilot signal are transmitted using matching radiation patterns.

2. The method as claimed in claim 1, wherein said mobile stations use power measured from said first pilot channel transmitted having said predetermined radiation pattern to facilitate a handover.

3. The method as claimed in claim 1, wherein said mobile stations use said received second pilot channel as phase references in coherent reception of said at least one data signal.

4. The method as claimed in claim 1, wherein said base station receives a signal from one of said mobile stations through an antenna group, said antenna group comprising a plurality of antennas, incoming directions and delays of signal components are searched for in said signal, and when said at least one data signal is transmitted from said base station to said one mobile station, said radiation pattern is formed based on a power measurement of said signal.

5. The method as claimed in claim 4, wherein said one mobile station transmits to said base station information about a number, a power level, and a relative delay of a plurality of components of said at least one data signal received at said one mobile station, and said information is used by said base station to form said radiation pattern of said signal to be transmitted to said one mobile station.

6. The method as claimed in claim 1, wherein said predetermined radiation pattern has an omnidirectional form.

7. The method as claimed in claim 1, wherein, when said predetermined radiation pattern is transmitted, a higher transmit power is used than on channels using traffic channels.

8. The method as claimed in claim 1, wherein, when said predetermined radiation pattern is received, a larger processing gain is used than on channels using traffic channels.

9. The method as claimed in claim 1, wherein radiation patterns used in said transmission directions that change in time have a substantially beam-like shape.

10. A cellular radio system comprising:

in each cell, at least one base station configured to communicate with mobile stations located within its coverage area, the communication including (i) transmitting information about said system to said mobile stations using control channels, and (ii) transmitting at least one data signal to said mobile stations using radiation patterns that change in time, wherein said at least one base station is configured to transmit at least one first pilot signal to all mobile stations within the cell, said pilot signal having a predetermined radiation pattern, said predetermined radiation pattern defining the coverage area for said cell, wherein said at least one base station is configured to transmit a second pilot signal in said transmission directions that change in time and said second pilot signal being incapable of carrying control information, and wherein said at least one data signal and said second pilot signal are transmitted using matching radiation patterns.

11. The cellular radio system as claimed in claim 10, wherein said base station comprises a transmitter which transmits said second pilot channel in the same transmission direction as said at least one data signal.

12. A cellular radio system comprising:

in each cell, at least one base station configured to communicate with mobile stations located within its coverage area, the communication including (i) transmitting information about said system to said mobile stations using control channels, and (ii) transmitting at least one data signal to said mobile stations using transmission directions that change in time, wherein said at least one base station is configured to transmit at least one first pilot signal to all mobile stations within the cell, said pilot signal having a predetermined radiation pattern, said predetermined radiation pattern defining the coverage area for said cell, wherein said at least one base station is configured to transmit a second pilot signal in said transmission directions that change in time, said at least one data signal and said second pilot signal are transmitted using matching radiation patterns, and said second pilot signal is incapable of carrying control information, and wherein said base station comprises:
- at least one antenna group, said antenna group including a plurality of antennas,
- a group of radio-frequency units connected to said antenna group,
- at least one channel unit, an input of said channel unit being configured to receive signals from said radio-frequency units, said channel unit comprising a phaser configured to phase said at least one data signal to be transmitted and received with said antenna group so that a gain obtained from said antenna group is largest in a desired direction,
- a control unit configured to control said channel unit,
- a separator configured to separate data containing connection quality information from the signals received by each mobile station, and
- a baseband unit connected to the output of said channel unit, said channel unit further comprising:
  - a searcher configured to search for incoming directions and delays of best signal components received from said mobile stations, and
  - a controller configured to control formation of radiation patterns used when transmitting said at least one data signal from said base station to said mobile station based on a power measurement of said at least one data signal and said connection quality information received from said mobile station.

13. The cellular radio system as claimed in claim 12, wherein each said channel unit further comprises
- an encoder which encodes said at least one data signal to be transmitted,
- at least one transmission block, an input of said transmission block comprising a signal obtained from said encoder, and
- at least one searcher block, an input of said searcher block comprising a signal obtained from said radio-frequency units.

14. The cellular radio system as claimed in claim 13, wherein said searcher block comprises
- a phaser, an input of said phaser is a signal obtained from said radio-frequency units,
- a detector which detects whether a signal obtained from said phaser and received from a certain incoming direction comprises the desired signal component having a certain delay and which measures the power of said signal component,
- a measurer which measures desired incoming directions and delays of said signal to be received, and
- an informer which informs said controller of a corresponding channel unit of said incoming direction, delay and power of each detected signal component.

15. The cellular radio system as claimed in claim 13, wherein said transmission block comprises
- a modulator, having an input and an output wherein said input of said modulator is a signal obtained from said encoder,
- a phaser, an input of said phaser is a signal visible at said output of said modulator, and
- a controller which controls said phaser so that said largest gain of said at least one data signal to be transmitted is set in said desired direction.

16. A cellular radio system comprising:
in each cell, at least one base station configured to communicate with mobile stations located within its coverage area, the communication including (i) transmitting information about said system to said mobile stations using control channels, and (ii) transmitting at least one data signal to said mobile stations using transmission directions that change in time, wherein said at least one base station transmits at least one first pilot signal to all mobile stations within the cell, said pilot signal having a predetermined radiation pattern, said predetermined radiation pattern defining the coverage area for said cell, wherein said at least one base station is configured to transmit a second pilot signal in said transmission directions that change in time and said second pilot signal is incapable of carrying control information, wherein said at least one data signal and said second pilot signal are transmitted using matching radiation patterns, and wherein said base station comprises:
- at least one antenna group, said antenna group including a plurality of antennas,
- an analog phaser connected to said antenna group and configured to phase received signals so that a gain obtained from said antenna group is largest in desired beam-like directions,
- a group of radio-frequency units, each said radio-frequency unit having an input and an output wherein said input of said radio-frequency units is configured to receive said phased signals,
- a digitizer connected to said output of said radio-frequency units and configured to digitize said output of said radio-frequency units,
- at least one channel unit, an input of said channel unit being configured to receive digitized signals output from said digitizer, said channel unit comprising at least one measurer and switcher, the measurer and the switcher being configured to (i) search said digitized signals for antenna beams corresponding to incoming directions of a strongest signal component and (ii) measure delays of signal components, and
- a controller configured to control said phaser so that said largest gain of signals to be transmitted is set in said desired direction.

17. The base station as claimed in claim 16, wherein said analog phaser comprises a plurality of outputs, each of said outputs is a signal received by an antenna beam pointing in a certain direction.

18. The base station as claimed in claim 16, wherein said switcher
- guides desired digitized signals that are visible at an input of said switcher and that have been converted into an intermediate frequency, to a desired demodulator controlled by said measurer, said measurer controlling each said desired demodulator by synchronizing with said digitized signal guided thereto.

19. A method for transmitting pilot channels in a cellular radio network, having in each cell, at least one base station configured to communicate with mobile stations located within a respective area, the communication including (i) transmitting at least one data signal in a downlink direction, and (ii) transmitting system information to respective said mobile stations on control channels, said method comprising:

said at least one base station transmitting at least one first pilot signal to all mobile stations within the cell, said pilot signal having a predetermined radiation pattern, the predetermined radiation pattern defining a coverage area for said cell; and said at least one base station transmitting a second pilot signal specific for at least one said mobile station located within said coverage area, using an antenna radiation pattern based on at least one signal received by said base station as a result of transmitting by said at least one mobile station, wherein said at least one data signal and said second pilot signal are transmitted using matching radiation patterns and said second pilot signal being incapable of carrying control information.

20. A cellular radio system comprising:

in each cell, at least one base station configured to communicate with mobile stations located within its coverage area, the communicating including (i) transmitting information about said system to said mobile stations using control channels, and (ii) transmitting at least one data signal to said mobile stations using transmission directions that change in time, wherein said at least one base station is configured to transmit at least one first pilot signal to all mobile stations within the cell, said pilot signal having a predetermined radiation pattern, said predetermined radiation pattern defining the coverage area for said cell, wherein said at least one base station is configured to transmit a second pilot signal in said transmission directions that change in time and said second pilot signal is incapable of carrying control information, wherein said at least one data signal and said second pilot signal are transmitted using matching radiation patterns and wherein said base station comprises:

at least one antenna group, said antenna group comprising a plurality of antennas, a group of radio-frequency units each said radio-frequency unit having an input and an output, wherein said input of said radio-frequency units is configured to receive a phased signal, a digitizer, connected to said output of said radio-frequency units and configured to digitize said output of said radio-frequency units, and at least one channel unit, an input of said channel unit being configured to receive a digitized signal output from said digitizer, said channel unit comprising at least one measurer and switcher, the measurer and switcher being configured to (i) search said digitized signal for antenna beams corresponding to incoming directions of a strongest signal component and (ii) measure delays of said components.

21. A method for transmitting pilot channels in a cellular radio network, having in each cell, at least one base station configured to communicate with mobile stations located within a respective area, the communication including (i) transmitting at least one data signal in a downlink direction, and (ii) transmitting system information to respective said mobile stations on control channels, said method comprising:

said at least one base station transmitting at least one first pilot signal to all mobile stations within the cell, said pilot signal having a predetermined radiation pattern, the predetermined radiation pattern defining a coverage area for said cell; and said at least one base station transmitting an un-modulated common control signal specific for at least one said mobile station located within said coverage area, using an antenna radiation pattern based on at least one signal received by said base station as a result of transmitting by said at least one mobile station, wherein said at least one data signal and said un-modulated common control signal are transmitted using matching radiation patterns.

* * * * *